G. A. NOETZEL & W. P. FERRIS.
NAIL.
APPLICATION FILED OCT. 28, 1912. RENEWED JULY 13, 1914.
1,117,429.
Patented Nov. 17, 1914.
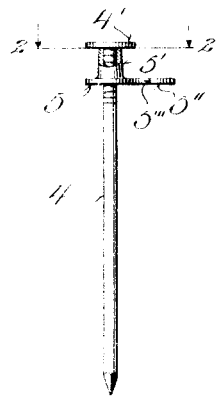
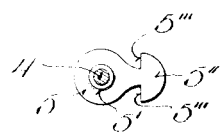
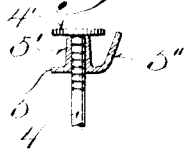

UNITED STATES PATENT OFFICE.

GUSTAV A. NOETZEL AND WILLIAM PAUL FERRIS, OF WAUKESHA, WISCONSIN, ASSIGNORS TO PRECISION METAL WORKERS, OF CHICAGO, ILLINOIS, A CORPORATION OF ILLINOIS.

NAIL.

1,117,429.  Specification of Letters Patent.  Patented Nov. 17, 1914.

Application filed October 28, 1912, Serial No. 728,248. Renewed July 13, 1914. Serial No. 850,802.

*To all whom it may concern:*

Be it known that we, GUSTAV A. NOETZEL and WILLIAM P. FERRIS, both citizens of the United States, and residents of Waukesha, in the county of Waukesha and State of Wisconsin, have invented certain new and useful Improvements in Nails; and we do hereby declare that the following is a full, clear, and exact description thereof.

Our invention consists in what is herein particularly set forth with reference to the accompanying drawings and pointed out in the claims of this specification its object being to combine ordinary nails with spacing-devices in the building of temporary structures, such as scaffolding, false-work, concrete-forms, crating and boxing, and various other woodwork designed to be taken apart, the spacing-devices serving to obviate the splitting of the wood into which the nails are driven and to facilitate the withdrawal of said nails without detriment to said wood, as well as to effect a saving in time, labor and material.

Figure 1 of the drawings represents a partly sectional side elevation of an ordinary wire nail and a spacing-device of novel construction thereon. Fig. 2, a horizontal section on the plane indicated by line 2—2 in Fig. 1, and Fig. 3, a view similar to Fig. 1, partly in section and illustrating a fragment of the nail and the spacing-device thereon having a lateral weakened extension or lip thereof bent upward.

Referring by numerals to the drawings, 4 indicates an ordinary wire nail that may be of any suitable gage, and loose on the nail, in opposition to the head 4' thereof, is a spacing device herein shown as a washer 5 having a preferably tapered outer sleeve-extension 5', and the washer is provided with a lateral extension 5'' constituting a lip normally on the plane of the inner end of said washer, this lip being preferably of diminished width approximately midway of its length to weaken the same, as shown in Fig. 2 whereby it may be readily bent outward, as shown in Fig. 3. The peculiar preferred construction of the lateral lip-extension 5'' of the washer also serves to provide the lip with shoulders 5'''.

The spacing-device on the nail limits the extent to which said nail may be driven into wooden material and thus splitting of this material, incidental to nail-driving, is prevented, while at the same time clearance is provided under the nail head to facilitate the employment of a claw for the withdrawal of the aforesaid nail. The washer and lateral lip extension thereof may serve in opposition to a claw to prevent marring of the adjacent wood by the claw, and the lip may be bent outward at an acute angle to the plane of the inner end of said washer to guide the claw under said spacing-device if desired, or said claw may be employed in opposition to the shoulders of the bent up lip-extension of the washer to facilitate pulling of the nail when more than ordinary leverage is desirable.

The dimensions of the sleeve and washer may be indefinitely varied, and for some nailing it is within the scope of our invention, as herein claimed, to omit said sleeve and depend upon the bending outward of the lip-extension of said washer to provide for its engagement with a claw when the accompanying nail is to be pulled, and the employment of a spacing device such as we have shown and described obviates splitting or otherwise damaging of the wood preliminary to a nail pulling operation.

We claim:—

1. The combination of a nail and a washer thereon having a lateral extension constituting a lip normally on the plane of the inner end of said washer adapted to be bent outward at an acute angle to the same.

2. The combination of a nail and a washer thereon having a lateral extension of diminished width approximately midway of its length.

3. The combination of a nail and a washer thereon provided with an outer sleeve-extension in opposition to the nail-head and having a laterally extending lip normally on the plane of its inner end.

4. The combination of a nail and a washer thereon provided with an outer sleeve-extension in opposition to the nail-head and with a lateral extension of diminished width approximately midway of its length.

In testimony that we claim the foregoing we have hereunto set our hands at Waukesha in the county of Waukesha and State of Wisconsin in the presence of two witnesses.

GUSTAV A. NOETZEL.
WILLIAM PAUL FERRIS.

Witnesses:
  ROBERT L. HOLT,
  ASA H. CRAIG.